US006851771B2

(12) United States Patent
Marler et al.

(10) Patent No.: US 6,851,771 B2
(45) Date of Patent: Feb. 8, 2005

(54) LOCKABLE WIRE ENCLOSURE AND LOCKING MECHANISM THEREFOR

(75) Inventors: Jon R. Marler, Marion, IN (US); Lori L. Graves, Marion, IN (US); Carrie L. Monce, Wabash, IN (US)

(73) Assignee: REC Enterprises, Ltd., Fort Wayne, IN (US)

(*) Notice: Subject to any disclaimer, the term of this patent is extended or adjusted under 35 U.S.C. 154(b) by 0 days.

(21) Appl. No.: 10/308,799

(22) Filed: Dec. 3, 2002

(65) Prior Publication Data

US 2004/0103598 A1 Jun. 3, 2004

(51) Int. Cl.[7] .............................................. A47B 46/00
(52) U.S. Cl. ..................... 312/249.8; 312/215; 312/216; 312/222; 292/59; 292/118; 292/161; 119/452
(58) Field of Search ................................ 312/215, 216, 312/222, 249.8, 290, 326, 327; 119/452, 453, 481, 494, 524; 292/4, 5, 6, 7, 59, 66, 118, 120, 161, 162; 52/106; 49/394, 395

(56) References Cited

U.S. PATENT DOCUMENTS

| 211,787 A | * | 1/1879 | Reynolds et al. ............... 292/7 |
| 1,603,397 A | * | 10/1926 | Nielsen ....................... 292/120 |
| 2,516,336 A | * | 7/1950 | Olander ........................ 292/65 |
| 3,255,618 A | * | 6/1966 | Hermann ...................... 70/114 |
| 3,556,058 A | * | 1/1971 | Smiler ........................ 119/474 |
| 3,596,403 A | * | 8/1971 | Carr ............................. 49/246 |
| 3,917,328 A | * | 11/1975 | De Filippi ..................... 292/7 |
| 4,509,805 A | * | 4/1985 | Welsch et al. ............... 312/210 |
| 5,016,926 A | * | 5/1991 | Sharp et al. .................. 292/42 |
| 5,743,605 A | * | 4/1998 | Marino ........................ 312/211 |
| 5,860,551 A | * | 1/1999 | Knott, Sr. ...................... 220/7 |
| 5,960,744 A | * | 10/1999 | Rutman ....................... 119/473 |
| D426,400 S | * | 6/2000 | Welling ........................ D6/430 |
| 6,192,834 B1 | * | 2/2001 | Kolozsvari ................... 119/498 |

OTHER PUBLICATIONS

Product Brochure—AMCO by GAI, Security Cart.
C&H Catalog p. 226, Genuine Metro qwikSLOT™ Security Trucks and GILLIS Mobile Security Trucks.
Product Brochure—Metro Commercial Products Digest, 1992, p. 15, Super Erecta Shelf® Security Trucks and Units.
Product Brochure—AMCO by GAI, p. 5, Heavyweight Security Carts.
Product Brochure—Eurokraft®, Security Trucks, p. 10.
Product Brochure—ISS Shelving, 1999, Security Shelving.
Product Brochure—Cannon Equipment, p. 16 Folding Carts.
Product Brochure—Technibilt CariAll, p. 32, Security Units.

* cited by examiner

Primary Examiner—Anita King
Assistant Examiner—Jon Szumny
(74) Attorney, Agent, or Firm—Baker & Daniels

(57) ABSTRACT

A lockable wire mesh security and closure including a locking member which engages and locks to both the top wall and the bottom wall of the enclosure. The locking member can be latched into position and locked in place to securely lock the enclosure.

12 Claims, 3 Drawing Sheets

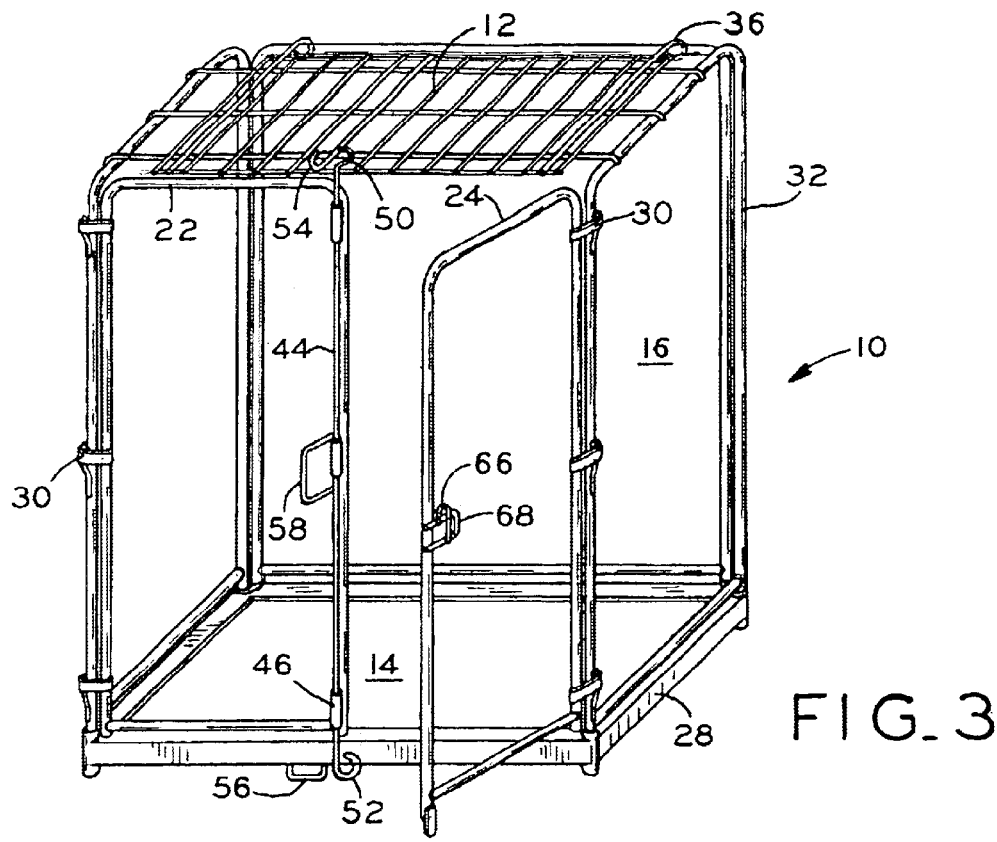
FIG_3
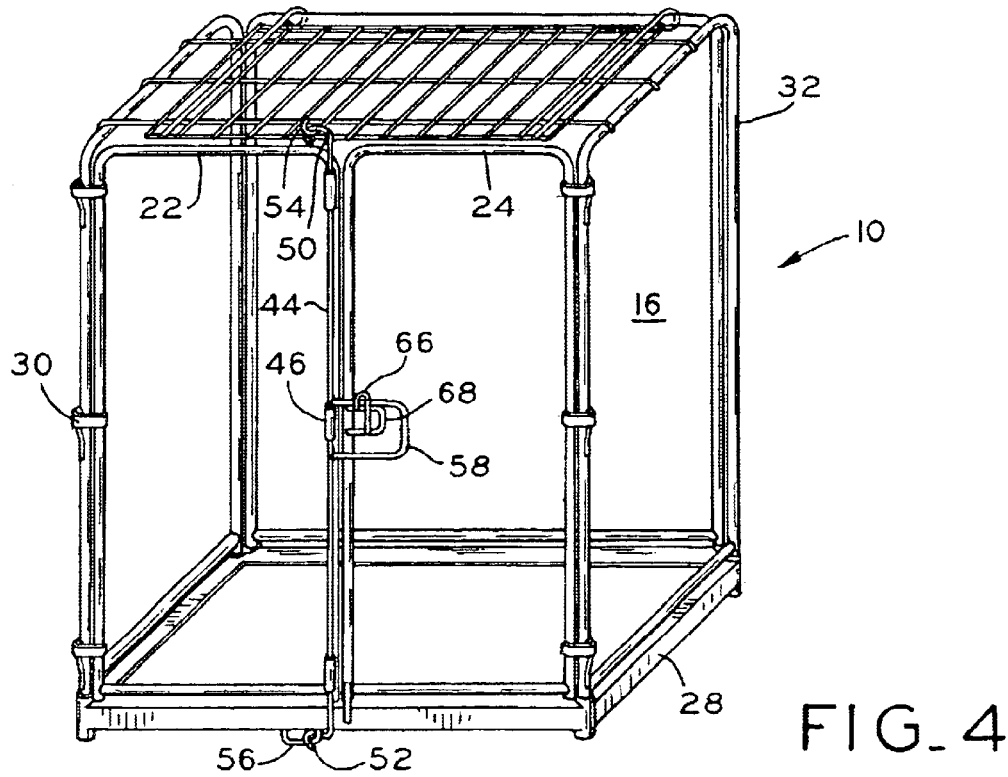
FIG_4

LOCKABLE WIRE ENCLOSURE AND LOCKING MECHANISM THEREFOR

BACKGROUND OF THE INVENTION

This invention relates to a wire enclosure and in particular to a lockable wire enclosure and a locking mechanism therefor.

Lockable wire enclosures are well known in the prior art and are conventionally used for securely storing valuable materials, such as packages, tools, valuable parts, medicines, and the like.

Conventionally, wire enclosures have been used for such storage since the stored items are fully visible so that inventory control is facilitated. Additionally, the stored items are accessible to airflow and to light for improved storage. Such secure storage prevents pilferage of the stored items, while still enabling authorized persons to access the materials. Many of such prior art wire enclosures are mounted on wheels or casters for ease of movement of the materials from place to place. Conventionally, the walls of such enclosure are made of a heavy-duty gauge wire mesh. While some prior art enclosures include a slidable front door, the more common arrangement is to have two hinged front doors. Conventionally also, the enclosures are provided with one or more wire mesh shelves.

Such prior art enclosures or security carts have used a variety of locking mechanisms to securely lock the doors in order to prevent access except to authorized persons. In some prior art enclosures, heavy-duty metal frames are provided, including conventional catalog locking arrangements for locking the door to the frame of the enclosure. A problem with such arrangements has been that the door is not securely locked to either the bottom wall nor to the top wall of the enclosure. This creates a problem in that the door may be forced away from the top wall or the bottom wall whereby unauthorized persons have access to the contents of the enclosure, while the door is still locked.

In other prior art arrangements, the doors have been made of solid metal or other solid materials such as wood. While this creates a more secure enclosure, the disadvantage of this arrangement is that visibility of the contents of the enclosure has been sacrificed to greater security.

Other prior art locking arrangements have also been used but these all have the disadvantage that the arrangements are expensive and therefore less desirable.

It is therefore desired to provide a wire mesh enclosure and a secure locking arrangement therefor.

In particular, it is desired to provide a wire mesh enclosure which may be securely locked while at the same time securing the doors to both the wire mesh top wall and the wire mesh bottom wall of the enclosure.

SUMMARY OF THE INVENTION

The present invention provides a wire mesh enclosure wherein the door or doors may be locked and, at the same time, securing the door(s) to both the top wall and the bottom wall of the enclosure by means of a locking mechanism.

The invention further comprises a wire enclosure which may be securely locked by means of a locking mechanism which includes a latch. A rod-like member is rotatably attached to one of the doors and is also slidable in a vertical direction relative to the door. The rod-like member includes hook members at both its top and bottom. The top wall and the bottom wall of the enclosure both include engaging hooks. The rod-like member, in the closed position of the door, may be rotated whereby the hook members engage the hook engaging members of the top and bottom enclosure walls and securely lock the door to the top wall and bottom wall. The rod-like member may also be raised to place the rod-like member in a latched position. The rod-like member may then be locked in position by means of a padlock or the like.

The invention also comprises a top wall, a bottom wall, first and second walls, and a door hingedly secured to the first side wall. A locking member is movably secured to the door. The locking member has one end. The engagement member is disposed on either the top wall or the bottom wall. Therefore, when the door is closed, the locking member may be moved to a locking position so that the end of the locking member engages with the engagement member and secures the door to one of the top wall and the bottom wall.

The invention still further comprises a wire enclosure having a top wire mesh wall, a bottom wire mesh wall, first and second wire mesh side walls, and first and second doors. The doors are hingedly secured to respectively the first and second side walls. A locking member is rotatably secured to the first door. The locking member has two ends. First and second engagement members are disposed respectively on the top wall and the bottom wall. When the door is closed, the locking member may be rotated to a locking position so that the two ends of the locking member engage with respectively the first and second engagement members and thereby secure the doors to both the top wall and the bottom wall.

The invention also comprises a latching mechanism for a wire enclosure. The wire enclosure includes a top wall, a bottom wall, and first and second hinged doors. A locking member is rotatably secured to the first door. The locking member includes two hooks. First and second engagement members are secured to both the top and bottom walls so that, when the door is closed, the locking member may be rotated and the hooks engage with the engagement member so thereby secure the door to both the top wall and the bottom wall.

BRIEF DESCRIPTION OF THE DRAWINGS

The above-mentioned and other features and advantages of this invention, and the manner of attaining them, will become more apparent, and the invention itself will be better understood by reference to the following description of embodiments of the invention taken in conjunction with the accompanying drawings, wherein:

FIG. 3 is a perspective view of a wire enclosure according to the invention showing one of the doors in the open position;

FIG. 4 shows the wire enclosure of FIG. 3 with both doors closed and the locking mechanism in the latched position;

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENT

Figure 1:
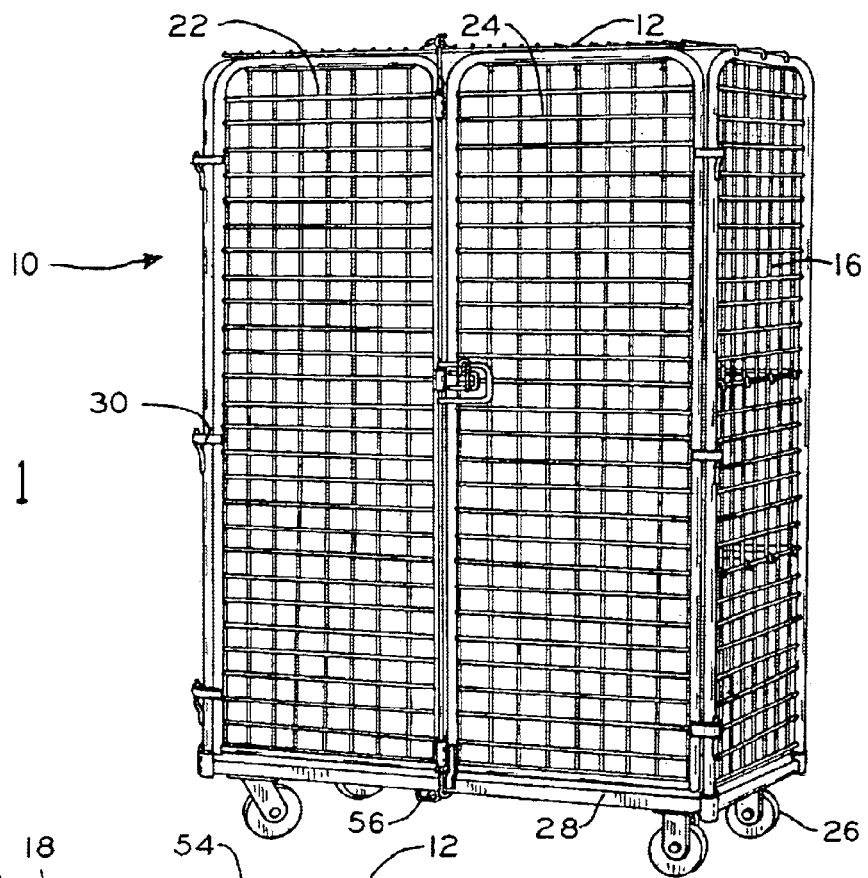
FIG. 1 is a perspective view of a security cart according to the invention.

Referring to FIG. 1, a wire enclosure 10 is shown which includes a top wall 12, a bottom wall 14, side walls 16 and 18, and a back wall 20. Two doors are shown hingedly respectively connected to the two side walls by means of six hinges, three of which are shown on each side of the enclosure. The enclosure is also provided with a bottom frame 28 and four casters so that the enclosure is a security cart. Casters 26 are optional for a stationary enclosure. Each of the walls and doors of the enclosure comprises a tubular steel frame and a heavy wire mesh which is welded to the frame. In the preferred embodiment, the round frame tubing is 1¼" 11 gauge, and the wire mesh is made of 1" 16 gauge wire. The base frame square tube is 1¼" 16 gauge steel with 1"×4" reinforced steel rod.

Figure 2:
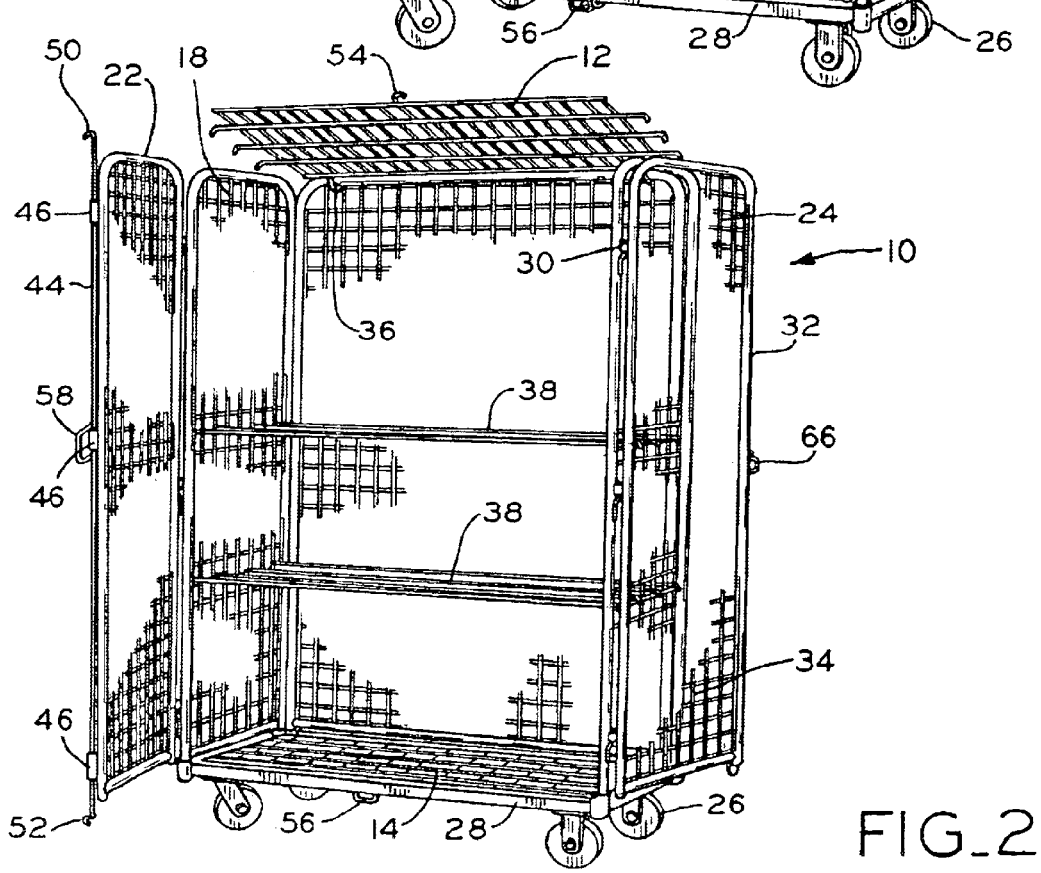
FIG. 2 shows the cart of FIG. 1 with the doors in the open position and the top wall hinged upwardly.

Referring to FIG. 2, two shelves 38 are shown. The shelves may also be made of heavy wire mesh or may be made of other materials such as wood. As further shown in FIG. 2, the top wall 12 is hingedly connected to the back wall by means of two hinges 36. These hinges may be loops at the ends of two wire members of the top wall wire mesh.

While each of the walls of the enclosure are made of a wire mesh material, it should be understood that any one or more of these walls may be constructed of a solid material such as, for instance, sheet steel material or wood. However, for ease in conducting a visual inventory of the contents of the enclosure, it is preferable that the walls are made of a wire mesh.

Figure 5:
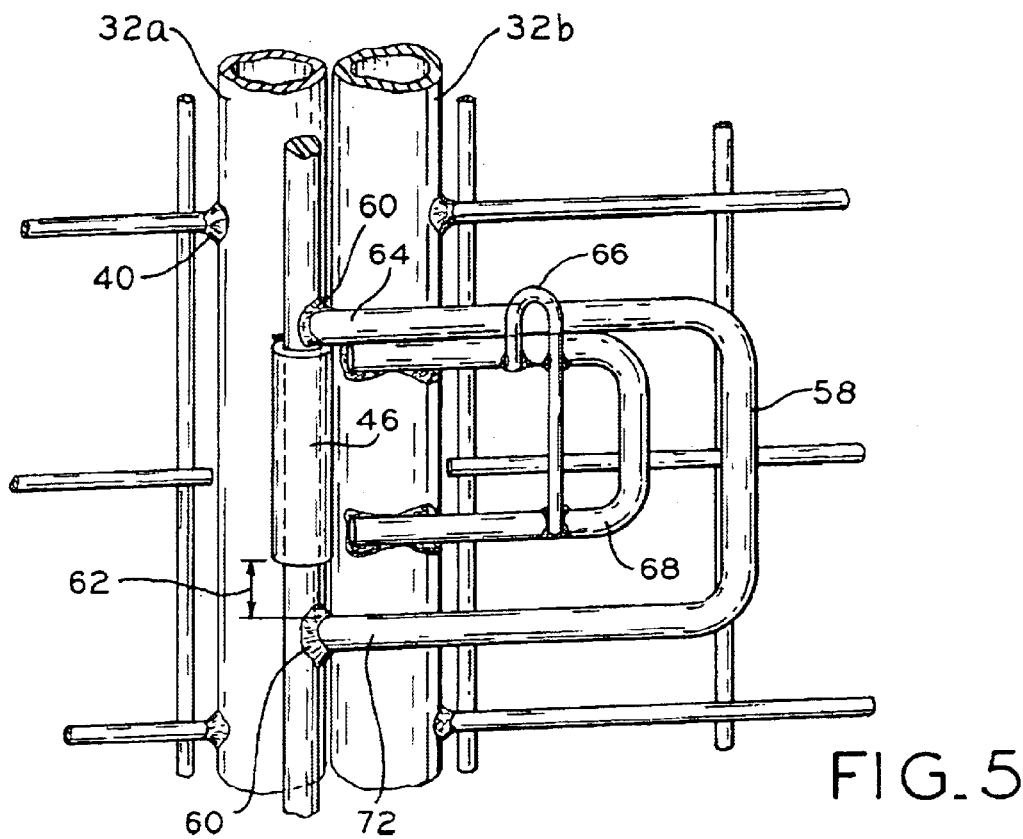
FIG. 5 shows an enlarged partial view of the locking mechanism according to the invention.

Referring now to FIGS. 1, 2, 5 and 6, a locking member 44 is provided on door 22. The locking member is shown as a rod-like member 44 which has hooks 50 and 52, respectively, at its top and bottom. Locking member 44 is rotatably secured to door 22 by means of three ferrules 46. Member 44 is not only rotatable in ferrules 46 but can also be moved up and down with respect to those ferrules, as seen in FIG. 2. By referring to FIG. 5, it can be seen that member 44 includes a handle 58 which is welded at 60 to member 44. Further, it can be seen that the top portion of the handle 64, in the position of FIG. 5, rests on ferrule 46 while the bottom portion of the handle 72 is located at a distance 62 below ferrule 46. Locking member 44 can therefore not only rotate relative to ferrule 46 but can also be moved up a distance 62 relative to ferrule 46. As best seen in FIG. 5, door 24 includes a latch holder 68 which is welded to tubular member 32b of door 24. A latch 66 is welded to latch holder 68. It should also be noted that, while two doors are shown in the embodiment of FIGS. 1–6, one door could be used.

Figure 6:
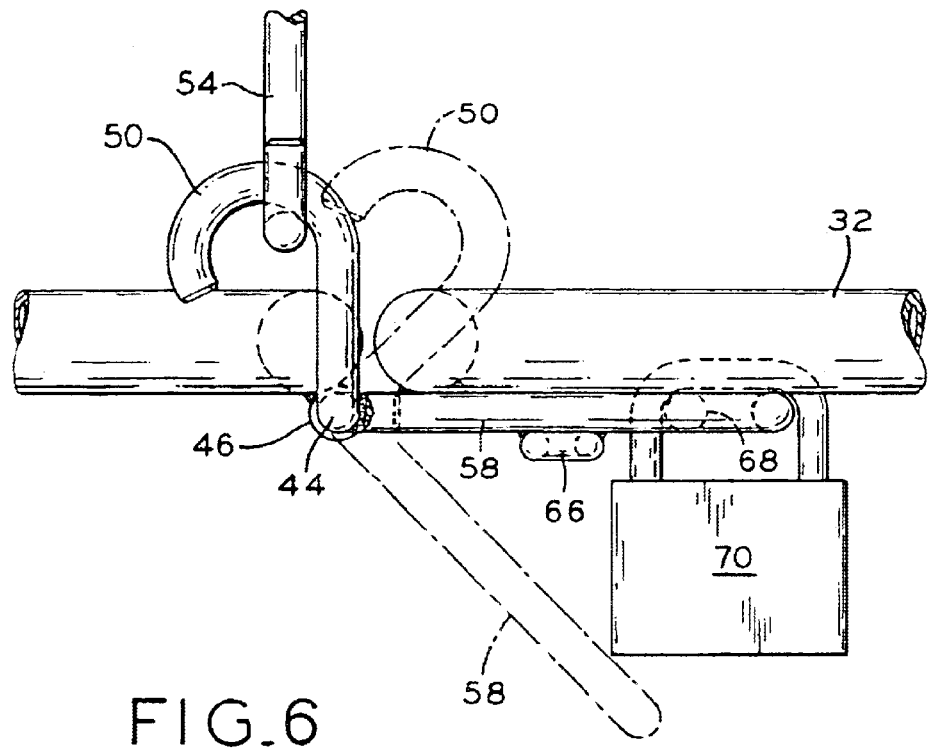
FIG. 6 shows an enlarged top view of the front area of the wire enclosure of FIG. 3 with the top hook member engaged with the top engaging hook.

In operation, as best seen by referring to FIGS. 3, 4 and 6, the two doors are shown in the open position of FIG. 3. It should be noted that for the sake of simplicity the mesh of the walls and doors of the enclosure is not illustrated in either FIGS. 3 and 4. Further, it can be seen that the enclosure of FIGS. 3 and 4 does not include casters. Top wall 12 includes a hook 54 which is formed from the end of a wire member of the top wall wire mesh. Similarly, bottom wall 14 includes a hook 56, shown here as a wire loop. Hook 56 is shown as a loop but may be an open hook similar to hook 54. Similarly, hook 54 may be a closed loop similar to hook 56.

FIG. 4 shows the doors 22 and 24 in the closed and latched position. To achieve this latched position, door 24 is closed, door 22 is closed, and thereafter locking member 44 is lifted a distance equal to or smaller than distance 62, while handle 58 is rotated, so that hook 50 engages hook 54, and hook 52 engages hook 56. Thereafter, handle 58 is moved downwardly into the position of FIG. 5, assisted by gravity, whereby handle 58 will be latched behind latch 66. In this position, it can be seen that locking member 44 securely engages top wall 12 and bottom wall 14, thereby securing the bottom wall 14 and the top wall 12 to door 22 and latching door 22 to door 24 by means of latch member 66. As shown in FIG. 6, a padlock 70 can then be used to lock latch holder 68 and handle 58 together so that doors 22, 24 and walls 12 and 14 are all securely locked together. The enclosure is now securely locked. To open doors 22 and 24, the procedure is reversed.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An enclosure comprising:
   a top wall;
   a bottom wall;
   first and second side walls;
   a first door hingedly secured to said first side wall;
   a second door door connected to said second side wall;
   a locking member rotatably and vertically movably secured to said first door, said locking member having one end;
   a handle secured to said locking member, and a latch secured to said second door; and
   a first engagement member disposed on one of said top wall and said bottom wall, whereby, when said first door is closed, said locking member may be rotated and moved vertically to a locking position so that said one end engages with said engagement member and secures said first door to one of said top wall and said bottom wall and said handle and latch are engaged.

2. The enclosure of claim 1 wherein said locking member comprises an elongated metal rod and wherein said elongated metal rod is secured to said first door by means of plurality of ferrules.

3. The enclosure of claim 1 further including a back wall, said top wall hingedly secured to said back wall.

4. The enclosure of claim 1 wherein at least one of said top wall, side walls, and doors are made of wire mesh.

5. The enclosure of claim 1 wherein said locking member has a second end and the other one of said top wall and bottom wall includes a second engagement member, whereby, when said locking member is moved to said locking position said locking member engages with said second engagement member and both said top and bottom walls are secured to said first door.

6. The enclosure of claim 5 wherein said two ends comprise two hooks.

7. The enclosure of claim 5 wherein said first and second engagement members comprise two hooks.

8. A wire enclosure comprising:
   a top wire mesh wall;

a bottom wire mesh wall;

first and second wire mesh side walls;

a back wall;

first and second doors hingedly secured to respectively said first and second side walls;

a locking member rotatably secured to said first door, said locking member having two ends; and first and second engagement members disposed respectively on said top wall and said bottom wall, whereby, when said first door is closed, said locking member may be rotated to a locking position so that said two ends engage with respectively said first and second engagement members and secure said first door to both said top wall and said bottom wall.

9. The enclosure of claim 8 wherein said top wall is hingedly secured to said back wall.

10. The enclosure of claim 8 further comprising a handle secured to said locking member and a latch secured to said second door, whereby said handle and said latch are engaged when said locking member is rotated to said locking postion.

11. The latching mechanism of claim 10 wherein said locking member is vertically movable and wherein said member is both rotated and moved vertically for engaging said handle with said latch.

12. The enclosure of claim 8 wherein said locking member comprises an elongated metal rod and wherein said elongated metal rod is secured to said first door by means of a plurality of ferrules.

* * * * *

UNITED STATES PATENT AND TRADEMARK OFFICE
CERTIFICATE OF CORRECTION

| | | |
|---|---|---|
| PATENT NO. | : 6,851,771 B2 | Page 1 of 1 |
| APPLICATION NO. | : 10/308799 | |
| DATED | : February 8, 2005 | |
| INVENTOR(S) | : Jon R. Marler et al. | |

It is certified that error appears in the above-identified patent and that said Letters Patent is hereby corrected as shown below:

At column 4, line 33, delete the second occurrence of the word "door".

Signed and Sealed this

Twenty-second Day of July, 2008

JON W. DUDAS
*Director of the United States Patent and Trademark Office*